Oct. 28, 1969  W. E. HUMPHREY  3,475,074
ACCIDENTAL-MOTION COMPENSATION WITH COLLIMATED LIGHT
Filed June 1, 1967  2 Sheets-Sheet 1
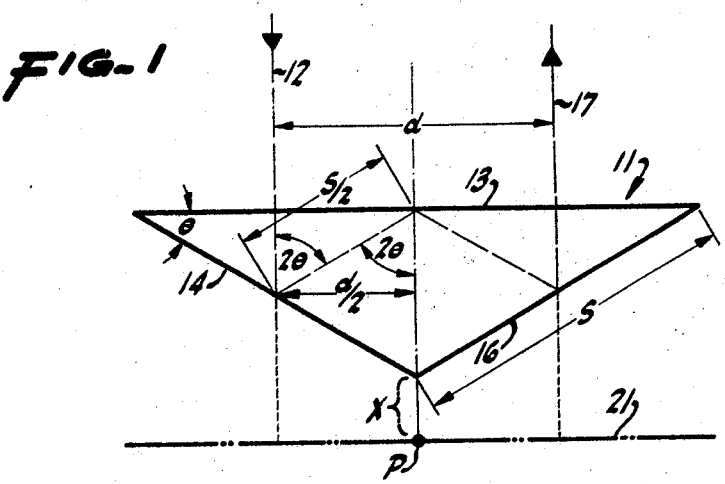
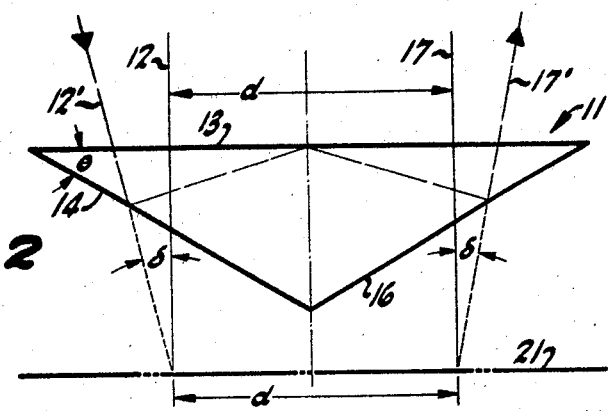
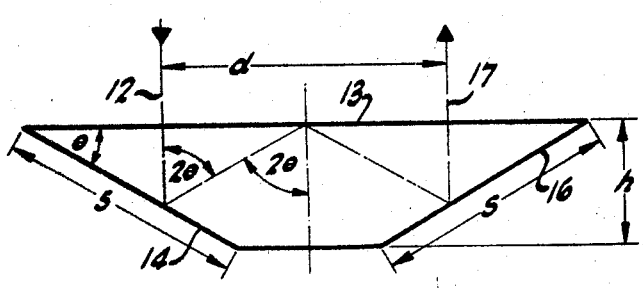
INVENTOR.
WILLIAM E. HUMPHREY
BY
Lippincott, Ralts & Henderson
ATTORNEYS Oct. 28, 1969 W. E. HUMPHREY 3,475,074
ACCIDENTAL-MOTION COMPENSATION WITH COLLIMATED LIGHT
Filed June 1, 1967
2 Sheets-Sheet 2
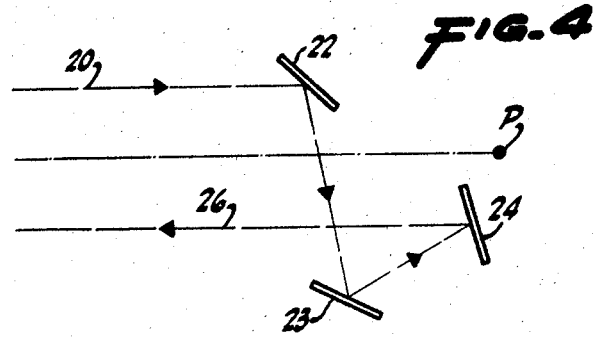
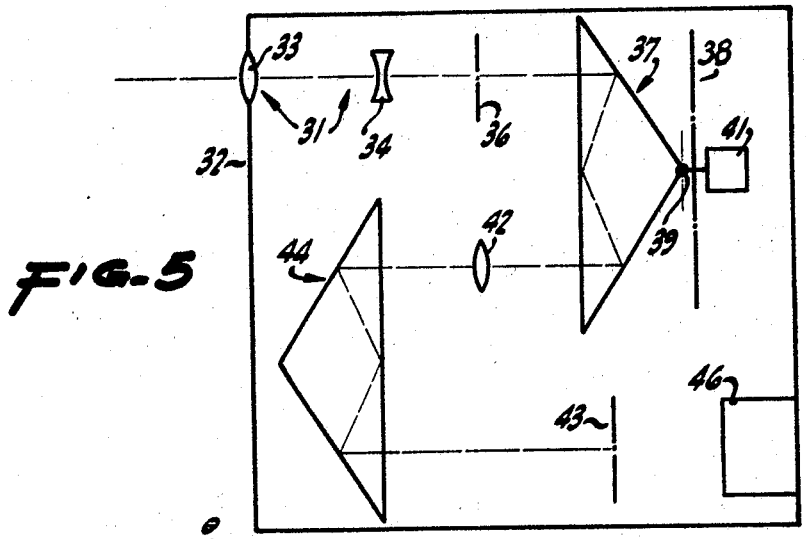
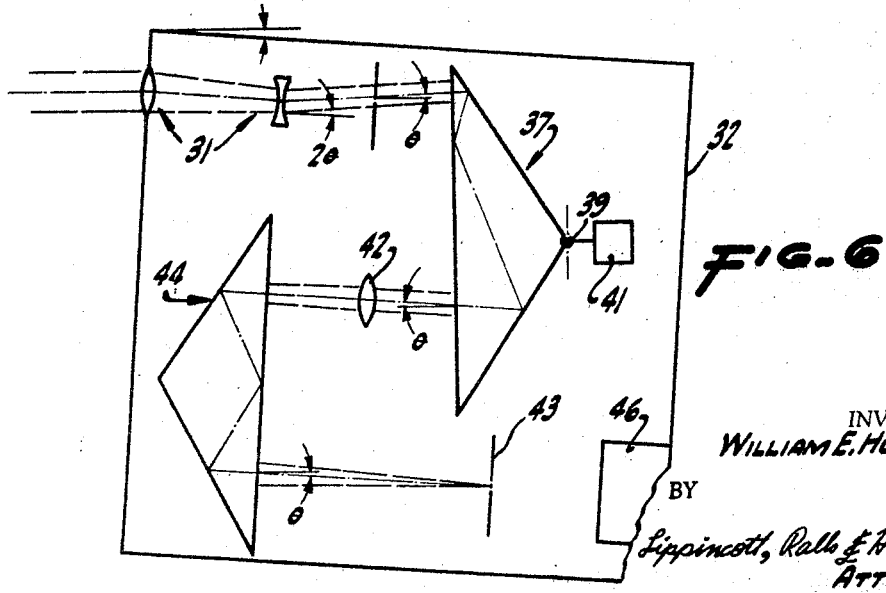
INVENTOR.
WILLIAM E. HUMPHREY
BY
Lippincott, Ralls & Hendricson
ATTORNEYS United States Patent Office 3,475,074
Patented Oct. 28, 1969

3,475,074
ACCIDENTAL-MOTION COMPENSATION WITH
COLLIMATED LIGHT
William E. Humphrey, Oakland, Calif., assignor to
Optical Research and Development Corporation,
Oakland, Calif., a corporation of California
Filed June 1, 1967, Ser. No. 642,766
Int. Cl. G02b 27/30
U.S. Cl. 350—16   5 Claims

ABSTRACT OF THE DISCLOSURE

An optical stabilizer having an optical train including a two-power erect image telescope followed by a stabilized triple-reflecting element therein to project stabilized collimated light.

There has been developed a variety of compensation methods and apparatus, primarily directed to levelling instruments, and generally operable only with regard to a vertical plane. Such systems might be termed pendulous systems. While certain of these prior art advances have proven highly advantageous, they are generally inapplicable to the generalized field of optics. In addition to the foregoing, there have also been developed certain stabilization systems adapted to compensate for accidental motions of optical systems; and in this category, for example, there are found refractive systems wherein one portion of a lens system is stabilized with regard to a line-of-sight, so that motion of other portions of such system establishes a corrective prism to remove error angles. There have also been advanced various other approaches to the problem of accidental-motion compensation in the field of viewing devices and cameras, for examples. These include electronic or electric compensation wherein light is represented by electron beams that are deflected to compensate for accidental motions, as well as electromechanical servo systems in which misalignments are sensed and corrective forces applied.

The present invention has much the same object as various prior art accidental-motion compensators, i.e., to provide a stabilized image plane in optical devices, such that small-angle variations from an original line-of-sight do not substantially move an image focused upon such plane. In this respect, reference is made to my copending patent application, Ser. No. 575,624, filed in the U.S. Patent Office on Aug. 29, 1966, for "Optical Stabilization by Reflecting Means."

The invention described below provides for the inertial stabilization of a triple-reflective element in a surrounding light-tight case and the direction upon such element of collimated light from an optical system of the type generally denominated as a Galilean telescope or erecting telescope. The invention operates to maintain the angular orientation of the reflective element relative to a line-of-sight despite small-angular deviations of the surrounding case. The reflecting element of the present invention is mounted to remain in line-of-sight position, and is stabilized against "pitch" and "yaw" but not necessarily against "roll" about an optic axis. In the following description the terms "angular orientation" and "angular deflection" are taken to refer to angles with respect to the axis of an original line-of-sight, and do not refer to rotations about such axis. Although it is possible, in accordance with the present invention, to also accommodate for "roll" about the axis of an original line-of-sight, it is normally not necessary to provide this additional degree of compensation for the majority of optical devices. It is to be further noted that the reflective element of the present invention is adapted to be embodied in either one or more prisms having three reflective surfaces or three particularly oriented mirrors, or the like, which provide a substantial optic equivalent thereof.

With regard to the specific improvements afforded by the present invention, it is noted that the invention hereof operates upon incoming light to direct the light in parallel rays through the inertial-stabilized compensator and into the remainder of the optical system. This then provides substantial optical advantages that will be appreciated by those skilled in the art, while also providing certain mechanical advantages. The invention thus serves to overcome certain prior art difficulties and limitations with regard to precision of manufacture and exactness of tolerances, both with regard to placement and movement. More specifically, the utilization of collimated light or parallel light rays in an accidental-motion compensator for optical devices obviates prior art limitations upon precise alignment and freedom from internal vibrations, such as may be occasioned by inaccurately aligned or imperfectly fitting bearings on gyroscopes, or the like, that may be employed in such systems. It is possible herein to employ shock mounting of elements for protective purposes, even though this may allow minor movements and misalignments hitherto considered intolerable. Various other advantages of the improvement of the present invention will become apparent from the following description.

The invention is illustrated in the accompanying drawings wherein:

FIGURE 1 is a diagram illustrating light-reflecting properties of a prism that may be physically stabilized as a portion of the present invention;

FIGURE 2 is a diagram illustrating light-reflection relationships for an altered angle of incidence in the illustration of FIGURE 1.

FIGURE 3 is a diagram of a second example of a triple-reflecting prism applicable for utilization in the present invention.

FIGURE 4 is a schematic illustration of one triple-mirror configuration of a unit that may be physically stabilized as a portion of the present invention;

FIGURE 5 is a diagram of one embodiment of the present invention; and

FIGURE 6 is an illustration of the invention inclined at an angle $\theta$ with respect to an original line-of-sight.

The present invention may be best understood by first considering the geometry characteristics of a triple-reflection element employed in the present invention as the inertially-stabilized component. Such an element is described in U.S. patent application Ser. No. 592,369, filed in the U.S. Patent Office on Nov. 7, 1966, for "Accidental-Motion Compensation by Triple Reflection," by the present inventor. Such an element is illustrated in FIGURE 1 as to a single, specific embodiment thereof. There is shown in FIGURE 1 a prism 11 having the shape of an isosceles triangle with corner angles $\theta$ equal to 30° for this example. Although the element 11 need not be formed of glass, it is for convenience hereinafter denominated as a "prism." In actuality, the moving element 11 need not take the physical form of a prism, but may, instead, be comprised of an appropriate combination of reflecting surfaces, such as plane mirrors.

In this particular example illustrated in FIGURE 1, light rays are illustrated as entering the prism along an axis 12 perpendicular to a flat front surface 13 thereof, and travelling to one of a pair of rear reflecting surfaces 14 and 16. The light is reflected from this rear surface 14 back to the front surface 13 whence it is again reflected back to the other rear surface 16, and from there reflected back out of the prism along an axis 17 which is shown to be parallel to the entering axis 12. Entering and exiting light-ray axes are seen to be displaced some distance $d$. Considering further the geometry of this particular arrangement and denominating the length of each rear surface 14 and 16 as S, it will be apparent that light is reflected from the surface 14 at an angle $2\theta$ to the light striking such surface. The reflected light in this geometry travels a distance $S/2$ to impinge upon and be reflected from the front surface 13 at a point displaced $d/2$ from the entering axis 12. From this geometry there may then be derived the straightforward geometric relationship sin $2\theta = d/S$. Further to the general geometry of this arrangement, the path length of light in the prism may be determined by adding together the four separate portions thereof as indicated in FIGURE 1 as follows:

$$S/2 \sin \theta + S/2 + S/2 + S/2 \sin \theta$$

This reduces to path length $L = S(1 + \sin \theta)$.

Consideration of this particular arrangement shows that light rays travelling in the material of the prism appear to enter along the line 12 and to leave along another line 17, as if they had been reflected from a plane mirror, but translated by a distance $d$. For rays travelling in the glass, or other material of the prism, this apparent plane mirror, or effective mirroring plane, is located a distance $S/2$ $(1 - \sin \theta)$ behind the vertex of the prism. This relationship may be derived from further consideration of the geometry of the arrangement and subtraction of the distance between the vertex of the prism and the front surface 13, from the total distance between the front surface 13 and this effective mirroring plane 21. Although the foregoing discussion deals only with a light ray along the optic axis and displaced $d/2$ from the pivot P, the fact that the system acts like a plane mirror with translation means that other rays are likewise affected. Refractive effects will change the apparent position of this effective mirroring surface slightly; however, in the interests of simplicity in this example, each of the reflective surfaces 13, 14 and 16 are hereinafter considered as merely reflecting surfaces, or mirrors, so as to avoid the complications of refractive effects. In actuality, it is quite practical to build a system embodying the present invention utilizing mirrors rather than a prism wherein the front mirrors has the width less than $d$ to block only a limited portion of the rear reflective surfaces adjacent the apex thereof.

Following the foregoing general discussion of one example of the system of the present invention, it is possible to consider the effects of variations in the angle of incident light upon the prism. The purpose of these considerations will become more apparent from the following description of practical embodiments of the present invention. There is illustrated in FIGURE 2 a prism 11 which may be identical to that illustrated in FIGURE 1; and there is shown by the light lines 12 and 17 the central light ray or optic axis of entering and emerging light, as in FIGURE 1. There is also illustrated an optic axis 12' inclined at some angle other than 90° with respect to the front face of the prism. A light ray entering the prism along the line, or axis, 12' will be reflected from the rear surface 14 to the front surface 13 and thence back to the other rear surface 16 and out of the prism along the line 17', as illustrated. The incident ray 12' is shown to enter the prism at an angle $\delta$ with respect to perpendicular, as would be expected from a plane-reflecting surface. Thus the angle of incidence equals the angle of emergence from the prism, as would be the case if the prism were a plane mirror located at the plane 21. Likewise, for this ray 12', there is produced a displacement $d$ along the effective mirroring plane 21 just as in the case where the light ray entered perpendicularly to the prism. The foregoing also holds true for varying points of incidence of the incoming ray along the surface of the prism within the acceptance of the entrance and exit apertures thereof. Thus it will be seen that the prism described above may be optically considered as a plane mirror with a predetermined translation between incident and reflected rays. These properties are of particular importance insofar as accidental-motion compensation is concerned, for lateral movement of the prism relative to incident light rays, within acceptable limits, does not affect the angle of reflection or the displacement of incoming and outgoing light rays. It is to be further noted that in common with the plane-reflecting surface, the prism of the present invention provides an angle of $2\delta$ between incident and reflected light rays wherein $\delta$ is the angle of incidence with respect to a perpendicular to the front surface of the prism.

There have been discussed above geometrical relationships between elements of a simplified reflective unit, or prism; and, consideration given to the effect of varying the angle of incident light which may be produced by rotation of such a prism. In the foregoing discussion of FIGURE 2, however, it is herein noted that it is also possible to rotate the prism about pivots located at any of a variety of places, inasmuch as this merely translates the mirror system which is not sensitive to translation inasmuch as it behaves as a plane mirror. It is noted that there results a variation in path length with rotation of the system about pivot points at varying positions.

It is possible with a reflective system of the type described above to achieve image stabilization of the type required for accidental-motion compensation, either with cameras or optical-viewing devices. In this respect, it is particularly noted that for camera applications, accidental-motion compensators should maintain an image from the objective substantially stationary, or in a fixed position, on a film plane. In this way, small accidental movements or vibrations of a camera housing to which the objective and film plane are secured will be properly compensated, so that a stabilized image is presented to the film at the coincident stabilized-image plane and film plane. On the other hand, optical-viewing devices such as telescopes and binoculars require a modified stabilization, so that light rays leaving the device will not appear to the viewer to be deflected with device vibrations. A full explanation of this difference in stabilization is set forth in my copending patent application Ser. No. 575,624, filed in the U.S. Patent Office on Sept. 1, 1966, and entitled "Optical Stabilization by Reflecting Means." Reference is made to such above-identified patent application for a complete discussion of this point; however, it is briefly noted herein that camera stabilization, or one-hundred-percent stabilization, as it is sometimes termed, is to be modified by the factor $$\left(1 \pm \frac{1}{M}\right)$$

for optical-viewing devices wherein M is the magnification of the optical system. The fraction of "camera stabilization" required for erecting viewing devices is $$\left(1 - \frac{1}{M}\right)$$

and, for inverting viewing devices, the fraction of "camera stabilization" is $$\left(1 + \frac{1}{M}\right)$$

In the following discussion of the present invention, reference is generally made to camera stabilization; and it is to be understood that such is to be modified by the foregoing factor for optical-viewing devices, such as binoculars, telescopes and the like.

It will be appreciated that the example described above employs three reflective surfaces identified in the drawing as 13, 14 and 16. Although these surfaces must have certain relationships with respect to each other, as described in more detail below, it is normally not necessary for the surfaces to have the physical extent illustrated in the foregoing example. Thus, as a second example of the present invention, reference is made to FIGURE 3 wherein the rear point of the prism is removed. In this instance, and employing the same conventions wherein $d$ is a separation of the incoming and outgoing axes, $\theta$ is the corner angle of the prism and S is the length of the back sides of the prism, there results a somewhat different relationship from that derived above. Assuming that the incoming axis 12 strikes the rear surface 14 at a point one-half the distance between the front and rear surfaces of the prism, separated by a distance $h$, then it is possible by straightforward trigonometric calculations to derive the relationship that $h = S \sin \theta$ and that $$d = \frac{S \sin \theta \sin 2\theta}{\cos 2\theta}$$

which may be reduced to $d = S \sin \theta \tan 2\theta$. In this particular example, illustrated in FIGURE 3, the total path length light in the prism is $$L = (S \sin \theta)\left(1 + \frac{1}{\cos 2\theta}\right)$$

and also the deflection plane 21 is displaced from the prism surface by $$\tfrac{1}{2} (S \sin \theta)\left(1 + \frac{1}{\cos 2\theta}\right)$$

In the foregoing discussion of a generalized triple-reflection system, the position of the reflecting surfaces was defined in terms of an angle $\theta$ and a distance S. It is particularly noted that certain limitations exist upon the angle $\theta$. It is believed apparent, upon careful consideration of the invention, that the incoming light must not strike the first reflecting surface 14 at such a large angle of incidence that it will not be reflected back to the second reflecting surface 13. Consequently, the angle $\theta$ cannot be too large. Additionally, it is noted that the incoming light should not strike the first reflecting surface 14 at too small an angle of incidence, for otherwise it will be reflected almost directly back, and the translation $d$ will become too small for practical purposes. In practice, it has been found that the angle $\theta$, between the first and second reflecting surfaces, and, thus, also between the second and third reflecting surfaces, should be in the range of 15° to 45°. For an angle greater than 45°, the light rays tend not to reflect back to the second reflecting surface; and, on the other hand, for an angle $\theta$ less than 15°, the returning light rays are unduly close to the incident light rays for most practical applications. It is actually desired that a very substantial displacement of incident and reflected light rays occur, so that no interference exists therebetween and appropriate space be provided for utilization of the reflected light. Thus, for this embodiment of the prism of the present invention, whether construction as a prism or as three mirrors, should have the angle between the first and second reflecting surfaces in the range of 15° to 45°.

In addition to the above-described limitation upon the angle $\theta$ in the triple-reflection system hereof, it is particularly noted that the reflecting planes 13 and 14 and 16 are to be so oriented that each contains a line parallel to a line in the other plane. This may be alternatively stated that each of the reflecting planes has a line normal thereto which is perpendicular to a single line. In the plane of the drawings in FIGURES 1 and 3, for example, this is clearly shown wherein each of the planes may be considered to be vertical. In addition to the foregoing limitation, it is also required that the reflecting planes be so oriented that the original axis of entering light 12 is substantially parallel to the axis of the exiting light 17 at the zero-compensation position. The physical relationship of individual reflecting planes of the invention remains fixed, and any and all movement of the prism moves these reflecting planes together. It is also particularly noted that the reflecting surfaces 13, 14 and 16 may be comprised of plane mirrors, for example, disposed in fixed relationship to each other. Under these circumstances the front reflecting surface 13 must have a limited lateral extent, so as to not interfere with entering the emerging light. For example, the front surface 13 may comprise a mirror having a lateral extent equal to or slightly greater than that of the rear surface of the prism illustrated in FIGURE 3, in which case the full reflecting properties of the front surface remain available for utilization for the second reflection of the light in the element.

Following the limitations set forth in the preceding paragraph, it will be appreciated that certain alternative configurations of the present invention are possible, and are, in fact, quite practical. In the embodiment of the present invention, schematically illustrated in FIGURE 4, light entering along an optic axis strikes a first plane mirror 22, and is reflected therefrom to a second plane mirror 23. This second mirror 23 reflects the light onto a third plane mirror 24 which, in turn, reflects the light along an outgoing axis 26 which is parallel to the incoming axis 20. The individual mirrors 22, 23 and 24 are disposed so that the light bundle entering the mirror will be parallel to the light bundle leaving the mirror; and it may, for example, be assumed in FIGURE 4 that the individual mirrors are vertically disposed to comply with this condition. Insofar as the relative angles between the surfaces of the mirrors are concerned, same are herein adjusted so that the emergent optical axis 26 is parallel to the entering optical axis 20. It will be appreciated that this allows a substantial degree of freedom in the relative positioning of the three reflecting surfaces. It is, however, particularly noted that the mirrors are disposed in fixed relationship to each other, so that their relative orientation remains the same, despite the fact that the entire unit comprised of the mirrors may actually move relative to the instrument case during usage of the invention.

In operation, the three reflecting surfaces are rigidly fixed together, and are then inertially stabilized with respect to a line-of-sight, i.e., the entering optic axis 20. This stabilization is accomplished about substantially mutually perpendicular axes that are each substantially perpendicular to the original optic axis, but need not intersect each other.

The present invention provides for a combination of a triple-reflection element such as generally described above and mounted for inertial stabilization with an optical system disposed in preceding relationship to such element. There is illustrated in FIGURE 5 such a combination wherein there is illustrated an optical system embodying the present invention. In the following discussion, examples are referenced to camera applications; however, it is to be borne in mind that stabilization correction, or modification, is required for optical-viewing devices, as set forth above. Referring to FIGURE 5, there will be seen to be illustrated a two-power erect image, terrestrial or Galilean telescope, mounted in fixed relation to a housing 32 about the system including the telescope. This telescope 31, in Galilean form, is composed of an objective lens 33 and "eyepiece" lens 34 disposed in displaced relationship along an optic axis and constituted to provide a two-power magnification. In this type of device the focal points of the two lenses 33 and 34 coincide at a focal plane 36. Light rays exiting the two-power Galilean telescope 31 are substantially parallel and will be seen to be directed upon an element 37, such as described above, and which acts as a plane mirror at an effective mirroring plane 38 with translation between incident and reflected light. This element 37 is a triple-reflection unit, of the type described above, formed either as a prism or mirror surfaces, and is mounted for free movement about two mutually perpendicular axes through a point 39. The element 37 is balanced about the point 37, as by means of a unit 41 which may, for example, comprise a free gyroscope as an assistance to inertial stabilization. In the instance wherein a gyroscope is employed, it is possible to provide controlled precessing means therefor, so that the element 37 is inertially stabilized for small-angle and high frequency movements of the housing 32 but is brought approximately into alignment with the housing for large-angle movements thereof. This, then, provides the capability of traversing the instrument as is required in panning of moving picture cameras, for example. Details of gyroscope construction, precession and tailoring of precessional characteristics are known in the art, and, consequently, are not described herein. It is noted, however, that rather precise control over gyroscope precession is possible.

Light which is reflected three times in the triple-reflection element 37 is then directed outwardly therefrom, as indicated, to a lens 42 which serves to focus the light upon a stabilized image plane 43 within the housing 32, after passing through a prism 44, with optical properties similar to that of prism 37. It is noted that the pivot point 39 may be located at any desired position; and, furthermore, that the pivot axes need not intersect each other, but may, in fact, be displaced from each other. It will be recalled from the above discussion that the element 37 acts in the manner of a plane mirror located at the effective mirroring plane 38; and it is to be particularly noted that such a plane mirror provides a doubling of the angle of incidence in reflected light. Consequently, it is necessary to provide for halving the compensation provided by a stabilized plane mirror or a doubling of the apparent angle of movement of incident light. While prior art devices of this particular type operate to halve mirror stabilization, the present invention operates to double the angle of incident light motion. This is herein accomplished by the two-power erecting telescope 31, for not only does the magnification apply to images viewed but also to movements. Referring to FIGURE 6, it will be seen that an actual deviation of the optic axis from a horizontal line-of-sight by an angle $\theta$ causes light to be incident upon the prism at a deviation of $2\theta$ with respect to the case. As the inertially-stabilized prism remains vertical, light is thus incident thereon at an angle $\theta$ with respect to the horizontal. Light is reflected from the stabilized prism as from a plane mirror at an opposite angle $\theta$ with respect to horizontal. Note that the prism 44 is rotated through an angle $\theta$ with the case, so that light is thus incident thereon perpendicularly (insofar as the axis of the light bundle is concerned). Light will thus be seen to be reflected on to the stabilized image plane 43 just as though the case had not been rotated. In the case of optical-viewing devices, such as telescopes or binoculars, the magnification of the erecting telescope 31 is modified to $$2 \div \left(1 \pm \frac{1}{M}\right)$$

in order to attain the requisite stabilization for viewing, as through following optics such as generally indicated at 46 in FIGURE 5, as described above and employing the same conventions.

The invention described above comprises a combination of a two-power Galilean telescope, or terrestrial telescope, preceding an inertially-stabilized element having an odd number of reflecting surfaces to thereby produce an equal and opposite movement of a focused image from that caused by housing motions of limited angles. By the utilization of the Galilean telescope in combination with an inertially-stabilized prism assembly, there is achieved a collimation of light through the compensation portion of the system, so that the triple-reflection element operates upon substantially parallel light rays. This utilization of parallel light in accidental-motion compensation removes prior art limitations of precise initial alignment and maintenance of such alignment during operation. Consequently, it is possible in systems employing gyroscopes, for example, to utilize relatively inexpensive and possibly imprecise bearings. It is thus possible to employ shock mounting for certain portions of the invention, even though this may result in certain internal vibrational translation of the prism. This is acceptable here with parallel light rays whereas in prior art devices any translation of the optical path may result in a smearing of the image.

The present invention provides a material advancement in the art which materially simplifies the construction of accidental-motion compensators, particularly insofar as the requisite precision of construction is concerned. With only a slight increase in complexity in the optical system, there is hereby achieved a major reduction in manufacturing difficulties and costs. It is to be further noted that a wide variety of additional optical elements may be incorporated into the overall optical train, and emergent light may be directed in any desired manner, either forward, backwardly or sideways, with respect to the incoming light. The illustration in FIGURE 5 incorporates an additional multiple-reflection element solely for the purpose of reversing the light in order to have the emergent light travel in the same direction as incident light. This is highly advantageous for most optical-viewing devices; however, it is not necessary for camera applications and the like. Without a reversing prism, or the like, a "camera image" would be reversed; and, thus, there is normally employed at least one mirror for parity correction.

Although the present invention has been described with respect to a single preferred embodiment thereof, it is not intended to limit the invention to the exact terms of the foregoing description or details of illustration, but, instead, reference is made to the following claims for a precise delineation of the true scope of this invention.

That which is claimed is:

1. An accidental-motion compensator for optical systems comprising: a housing, an approximately two-power erecting telescope system mounted for rigid movement with said housing, means including said erecting telescope for projecting a beam of collimated light from said system into said housing, reflecting means mounted in the path of said beam and positioned in the optical axis to reflect the collimated light from said beam in a direction displaced from the incoming beam from said telescope, said reflecting means being of the type wherein the angular deviation of the existing rays is twice the angle of the incident ray with respect to the axis of the reflecting means, inertial means mounted to said reflecting means to maintain said reflecting means in a substantially fixed angular position in space irrespective of small angular variations of said housing, and optical means including an optical element mounted rigidly to said case in the path of said beam reflected from said reflective means to form an image.

2. An accidental-motion compensator for optical systems comprising: a housing, an approximately two-power erecting telescope system mounted for rigid movement with said housing, means including said erecting telescope for projecting a beam of collimated light from said system into said housing, means including said erecting telescope for projecting a beam of collimated light from said system into said housing, a triple reflecting element disposed in the optical path to receive the incident projected beam from said telescope and to reflect a beam displaced and parallel to the incident beam, said triple reflecting element comprising three mirrored surfaces arranged at angles to reflect the light in a manner corresponding to a plane mirror disposed at a reflecting mirrored plane displaced between incident and reflecting light beams, inertial means mounted to said triple reflecting element to maintain said reflecting element in a substantially fixed angular position in space irrespective of small angular variations of said housing, and optical means including an optical element mounted rigidly to case in the path of the reflected light beam from said triple reflecting element constructed and arranged to form an image.

3. The compensator of claim 2 further defined by said triple-reflection element including three plane-reflecting surfaces with a second surface being disposed at the same angle with respect to the first and third surfaces and such angle being in the range of 15° and 45°.

4. The compensator of claim 1 further defined by the means inertially stabilizing said triple-reflection element including a gyroscope engaging said element and having a controllable precession.

5. The compensator of claim 1 further defined by the power of said telescope being equal to $$2 \div \left(1 \pm \frac{1}{M}\right)$$

wherein M is the overall magnification of the optical system and the sign of the relation is plus for an overall inverting optical-viewing system and minus for an overall noninverting optical-viewing system.

References Cited
UNITED STATES PATENTS

| | | |
|---|---|---|
| 1,639,229 | 8/1927 | Luckey. |
| 2,829,557 | 4/1958 | Jensen. |
| 2,939,363 | 6/1960 | Kaestner. |
| 2,981,141 | 4/1961 | Armstrong et al. |
| 3,153,689 | 10/1964 | Vargady. |
| 3,378,326 | 4/1968 | Alvarez. |

FOREIGN PATENTS

| | | |
|---|---|---|
| 226,163 | 5/1925 | Great Britain. |
| 232,759 | 4/1925 | Great Britain. |
| 223,983 | 10/1942 | Switzerland. |
| 599,955 | 3/1948 | Great Britain. |
| 878,463 | 9/1961 | Great Britain. |
| 1,254,479 | 1/1961 | France. |
| 1,386,114 | 12/1964 | France. |

DAVID SCHONBERG, Primary Examiner

P. R. GILLIAM, Assistant Examiner